US008264676B2

(12) United States Patent
Kanellopoulos et al.

(10) Patent No.: US 8,264,676 B2
(45) Date of Patent: Sep. 11, 2012

(54) DETECTING A DISTURBANCE IN THE PHASE OF LIGHT PROPAGATING IN AN OPTICAL WAVEGUIDE

(75) Inventors: Sotiris Emil Kanellopoulos, London (GB); Sergey Vladimir Shatalin, London (GB)

(73) Assignee: Fotech Solutions Limited, London (GB)

( * ) Notice: Subject to any disclaimer, the term of this patent is extended or adjusted under 35 U.S.C. 154(b) by 133 days.

(21) Appl. No.: 12/312,385

(22) PCT Filed: Nov. 8, 2007

(86) PCT No.: PCT/GB2007/004253
§ 371 (c)(1),
(2), (4) Date: May 12, 2010

(87) PCT Pub. No.: WO2008/056143
PCT Pub. Date: May 15, 2008

(65) Prior Publication Data
US 2011/0199607 A1    Aug. 18, 2011

(30) Foreign Application Priority Data

Nov. 8, 2006 (GB) .................................. 0622207.9

(51) Int. Cl.
*G01N 21/00* (2006.01)
(52) U.S. Cl. ........................ 356/73.1; 356/477
(58) Field of Classification Search .............. 356/73.1, 356/477, 478, 32–34; 340/555–556; 385/12–13; 250/227.14–227.19, 227.23; 398/20, 13
See application file for complete search history.

(56) References Cited

U.S. PATENT DOCUMENTS 5,194,847 A    3/1993 Taylor et al.
(Continued)

FOREIGN PATENT DOCUMENTS

EP    1 248 389 A    10/2002
(Continued)

OTHER PUBLICATIONS

Examination report for GB0622207.9, mailed on Nov. 23, 2010, 2 pgs.
(Continued)

*Primary Examiner* — Tri T Ton
(74) *Attorney, Agent, or Firm* — K&L Gates LLP

(57) ABSTRACT

A partially coherent Optical Time Domain Reflectometry (OTDR) apparatus has a light source comprising a directly modulated semiconductor Distributed FeedBack (DFB) laser diode for transmitting partially coherent light pulses along a monomode optical fibre. Light Rayleigh backscattered from the light pulses as they travel along the optical fibre is output from the end of the fibre into which the light pulses are transmitted to a Fibre Bragg Grating (FBG) filter. The FBG filter reduces the supectral width of light received at a photodetector. In one embodiment, the supectral width of the FBG filter is around one fifth of the supectral width of the light pulse after it has travelled around 1 km along the optical fibre. As a consequence of reducing the supectral width of the light received at the photodetector, the FBG filter increases the temporal coherence of the light. So, the FBG filter can ensure that the detected light is sufficiently coherent that a temporal supeckle pattern can be detected at the photodetector. At the same time, the light traveling in the optical fibre can be relatively supectrally broad so that non-linear effects in the optical fibre, such as Brillouin scattering, can be reduced.

32 Claims, 7 Drawing Sheets

U.S. PATENT DOCUMENTS

| | | | |
|---|---|---|---|
| 6,055,043 | A | 4/2000 | Chambers |
| 6,888,125 | B2* | 5/2005 | Ronnekleiv et al. ..... 250/227.19 |
| 7,872,736 | B2* | 1/2011 | Rogers et al. ................ 356/73.1 |
| 2004/0113056 | A1* | 6/2004 | Everall et al. ............ 250/227.23 |

FOREIGN PATENT DOCUMENTS

| | | |
|---|---|---|
| EP | 1422494 | 5/2004 |
| GB | 2239310 A | 6/1991 |
| GB | 2281618 A | 3/1995 |
| GB | 2374928 | 12/2001 |
| JP | 8152376 A | 6/1996 |
| WO | WO 01/22539 A | 3/2001 |
| WO | WO 02/065426 | 8/2002 |
| WO | WO 2006/048647 A | 5/2006 |
| WO | 2007/036051 | 5/2007 |

OTHER PUBLICATIONS

Choi et al., "Spectrally Stable Er-Fibre Laser for Application in Phase Sensitive Optical Time-Domain Reflectometry," *IEEE Photonics Technology Letters*, 15(3) (2003).

Izumita et al., "Fading Noise Reduction in Coherent OTDR," *IEEE Photonics Technology Letters*, 4(2) (1992).

Juarez et al, "Distributed Fiber-Optic Intrusion Sensor System," *Journal of Lightwave Technology*, 23(6) (2005).

Juarez et al., "Polarisation Discrimination in a Phase-Sensitive Optical Time-Domain Reflectometer Intrusion-Sensor System," *Optics Letters*, 30(24):15 (2005).

Kuppuswamy, H, "An experimental investigation of the sensitivity of a buried Fiber intrusion sensor", Master's Thesis, Texas A&M University, Dec. 2005.

Shimizu et al., "Characteristics and Reduction of Coherent Fading Noise in Rayleigh Backscattering Measurement for Optical Fibres and Components", *Journal of Lightwave Technology*, 10(7):982 (1992).

Souza et al., "Improvement of signal-to-noise capabilities of a distributed temperature sensor using optical preamplification", *Institute of Physics Publishing, Meas. Sci. Technol.* 12 952-957 (2001).

* cited by examiner

DETECTING A DISTURBANCE IN THE PHASE OF LIGHT PROPAGATING IN AN OPTICAL WAVEGUIDE

CROSS REFERENCE TO RELATED APPLICATIONS

The present application is a National Phase Application of International Application No. PCT/GB2007/004253 filed Nov. 8, 2007, which claims priority to Great Britain Patent Application No. 0622207.9 filed Nov. 8, 2006, which applications are incorporated herein fully by this reference.

FIELD OF THE INVENTION

This invention relates to an apparatus and method for detecting a disturbance in the phase of light propagating in an optical waveguide. More particularly, but not exclusively, the invention relates to improvements to phase sensitive Optical Time-Domain Reflectometry (OTDR) for detecting an externally induced, time-varying disturbance in the phase of light propagating in a monomode optical fibre.

BACKGROUND TO THE INVENTION

OTDR is an established technique for analysing the propagation of light in an optical fibre. In the telecommunications industry, the technique is widely used to detect and locate damage to optical fibres. The amount of light Rayleigh backscattered in an optical fibre as a light pulse travels along the fibre can be detected using a photodetector arranged at the end of the optical fibre into which the light pulse is transmitted. Analysing a signal generated by the photodetector representative of the detected backscattered light over time can allow determination of a spatial distribution of the amount of light backscattered at different points along the fibre. As more light is either absorbed or backscattered at locations of damage or such like, these locations can be identified from the determined spatial distribution.

A related technique, known as phase sensitive OTDR, recognises that when the light pulse is coherent and propagates in a monomode optical fibre, components of the light Rayleigh backscattered from the light pulse interfere with each other to generate a so-called temporal speckle pattern at the photodetector. The intensity of the temporal speckle pattern at any given moment depends on phase differences between the different components of Rayleigh backscattered light arriving at the photodetector at that moment. These components have been backscattered from the light pulse when it was at a corresponding spatial location in the fibre. Consequently, the momentary intensity of the temporal speckle pattern depends on conditions affecting the phase of light across the spatial extent of the light pulse at that location, e.g. the local refractive index of the fibre. Any local variation in these conditions between successive light pulses will result in a difference between the momentary intensities of the temporal speckle patterns of the respective light pulses corresponding to that location. Comparing signals generated by the photodetector for coherent light pulses transmitted successively along the fibre can therefore allow changes in the local refractive index, e.g. caused by external influences such as strain exerted on the fibre, to be detected and located.

It is well known that, for conventional OTDR, the temporal speckle pattern generated by any coherent component of the light pulse constitutes noise in the desired photodetector signal, which, in the absence of damage or such like, should ideally represent a smooth spatial distribution of backscattered light. Generally, light pulses used for conventional OTDR are therefore fairly incoherent, having spectral widths greater than around 500 GHz. This reduces the relative contribution of the temporal speckle pattern to the intensity of the backscattered light received at the photodetector.

On the other hand, for phase sensitive OTDR, backscattered light from any incoherent component of the coherent light pulses does not contribute to the temporal speckle pattern and therefore reduces the level of the wanted signal in the desired comparison between photodetector signals for successive light pulses. The comparison or "difference signal" should ideally just represent changes in the conditions affecting phase across the spatial extent of the light pulses at different locations along the fibre caused by changes in external influences occurring between transmission of the respective light pulses. The presence of differences due to changes in backscattering of incoherent light is undesirable.

So, in an implementation of phase sensitive OTDR described in U.S. Pat. No. 5,194,847 and improved by the paper "Polarisation Discrimination in a Phase-Sensitive Optical Time-Domain Reflectometer Intrusion-Sensor System", Juan C. Juarez et al, Optics Letters, Vol. 30, No. 24, 15 Dec. 2005, it is stipulated that the light pulses should be very coherent. More specifically, U.S. Pat. No. 5,194,847 states that the spectral width of the light source should be of the order of 10 kHz and the more recent paper states that the spectral width of the light source should be less than 3 kHz. This narrow spectral width is intended to reduce the contribution to the photodetector signals of light backscattered from the incoherent component of each light pulse.

One problem with this implementation is that cheap sources of very coherent light are not readily available. Bespoke light sources have been designed to try to meet the coherence requirements of U.S. Pat. No. 5,194,847 and the above paper, e.g. as described in the paper "Spectrally Stable Er-Fibre Laser for Application in Phase Sensitive Optical Time-Domain Reflectometry", Kyoo Nam Choi et al, IEEE Photonics Technology Letters, Vol. 15, No. 3, Mar. 2003, but these tend to be expensive. They are also prone to frequency drift. If frequency drift causes the frequency of the light source to change too much between successive light pulses, false differences between successive photodetector signals can be generated. Naturally, this limits the effectiveness of the technique.

Another problem is that the power of light pulses that can be launched into the optical fibre from coherent light sources is limited by various phenomena, particularly so-called "non-linear effects". Notably, Brillouin scattering causes light to be inelastically backscattered (e.g. converted to backwardly propagating light of a different wavelength to that of the light pulse), resulting in attenuation of the light pulse as it travels along the optical fibre. Brillouin scattering occurs at all light pulse powers, but over a given power threshold it increases significantly. Crucially, this power threshold depends on the spectral width of the light pulse. For a light pulse having a spectral width less than around 17 MHz and wavelength around 1550 nm travelling in a 10 km long single mode optical fibre made of silica, the power threshold is around 5 mW. This therefore limits the power of the light pulses used in the implementation described in U.S. Pat. No. 5,194,847 and the above paper. However, it will be appreciated that there is a requirement for the photodetector to receive as much backscattered light as possible in order to generate a useful signal. So, the implementations described in U.S. Pat. No. 5,194,847 and the above paper try to meet this need by increasing the duration of the light pulses rather than the power of the light pulses. Indeed, in U.S. Pat. No. 5,194,847 the light pulses are described as being approximately 100 ns in duration and in the improved version of the technique described in the paper the light pulses are described as being 2 μs in duration.

It will be understood that the location of a disturbance in the propagation of light in the optical fibre can only be resolved to the spatial extent of the light pulse in the fibre, as the intensity of the temporal speckle pattern at any given moment constitutes the sum interference of the light backscattered from each spatial point in the light pulse at an associated moment. The spatial extent of the light pulses therefore defines the maximum possible spatial resolution of the technique. A light pulse of 2 μs duration has a spatial extent of around 200 m, meaning that the maximum possible spatial resolution of the technique described in the above paper is 200 m. This is far from ideal.

One way to improve spatial resolution without increasing the power of the light pulses is to use light pulses of shorter duration, but average photodetector signals generated by light backscattered from a number of the light pulses to generate a stronger signal and then to carry out the comparison using successive such averaged signals. However, this reduces temporal resolution. In other words, it takes longer to identify changes in the temporal speckle patterns and hence changes in external influences on the optical fibre. Furthermore, it becomes impossible to resolve changes that are faster than the duration of the averaging time. Applications such as detection of acoustic waves and so on cannot therefore be realised.

The present invention seeks to overcome these problems.

SUMMARY OF THE INVENTION

According to a first aspect of the present invention, there is provided an apparatus for detecting a disturbance in the phase of light propagating in an optical waveguide, the apparatus comprising:

a light source for sending successive light pulses along the waveguide;

a photodetector for generating signals representing the time distributed intensity of light backscattered in the waveguide as respective light pulses travel along the waveguide; and a processor for comparing the signals to identify differences in the intensity of light backscattered in the waveguide as the respective light pulses travel along the waveguide, wherein the light pulses transmitted along the waveguide have a spectral width of the order of around 0.1 GHz to 100 GHz.

According to a second aspect of the present invention, there is provided a method of detecting a disturbance in the phase of light propagating in an optical waveguide, the method comprising:

causing a light source to send successive light pulses along the waveguide;

generating signals representing the time distributed intensity of light backscattered in the waveguide as respective light pulses travel along the waveguide; and comparing the signals to identify differences in the intensity of light backscattered in the waveguide as the respective light pulses travel along the waveguide, wherein the light pulses transmitted along the waveguide have a spectral width of the order of around 0.1 GHz to 100 GHz.

So, the invention recognises that it can be more effective to carry out phase sensitive OTDR using partially coherent light pulses rather than very coherent light pulses. Comparison of signals representing the intensity of light backscattered from partially coherent light pulses allows good visibility of changes in the rate of change of phase of light propagating along the waveguide between successive light pulses but, crucially, allows better signal-to-noise ratio (SNR) to be achieved for the detected signal and thus allows better spatial resolution and a faster response than obtainable from very coherent light pulses.

Importantly, the spectral width of the light pulses defined by the invention means that the potential effects of Brillouin scattering are significantly reduced in comparison to the spectrally narrower optical pulses used in the prior art. Ideally, the spectral width of the light pulses should be greater than the Brillouin Gain bandwidth for the optical waveguide, which is around 17 MHz for a silica optical fibre. Indeed, light pulses sent along the waveguide preferably have a spectral width of the order of around 1 GHz to 10 GHz or more ideally the light pulses sent along the waveguide have a spectral width of around 7.5 GHz. This allows the light pulses to have greater power than those used in the prior art. Typically, the power of the light pulses is of the order of around 0.1 W and 10 W or more ideally around 2 W. It also allows the light pulses to be shorter, e.g. to have spatial length of the order of around 1 m and 100 m, preferably of the order of around 1 m and 10 m or ideally around 1 m.

Usefully, the spectral width of the light pulses is defined by filtering the light output by the light source. More specifically, the apparatus may further comprise an optical filter for filtering the light before it reaches the photodetector, wherein the optical bandwidth of the optical filter is less than the spectral width of the light source. Likewise, the method may further comprise filtering the light before it reaches the photodetector using a filter having an optical bandwidth less than the spectral width of the light source. This filtering should be distinguished from conventional filtering to eliminate spontaneous emission or such like, which are outside of the main spectrum of light emitted by a light source. Here, importantly, the main spectrum of light emitted by the light source is narrowed. In other words, the linewidth of the light is reduced.

This is considered to be new in itself and, according to a third aspect of the present invention, there is provided an apparatus for detecting a disturbance in the phase of light propagating in an optical waveguide, the apparatus comprising:

a light source for sending successive light pulses along the waveguide;

a photodetector for generating signals representing the time distributed intensity of light backscattered in the waveguide as respective light pulses travel along the waveguide;

a processor for comparing the signals to identify differences in the intensity of light backscattered in the waveguide as the respective light pulses travel along the waveguide, and an optical filter for filtering the light before it reaches the photodetector, wherein the optical bandwidth of the optical filter is less than the spectral width of the light source.

Also, according to a fourth aspect of the present invention, there is provided a method for detecting a disturbance in the phase of light propagating in an optical waveguide, the method comprising:

causing a light source to send successive light pulses along the waveguide;

generating signals representing the time distributed intensity of light backscattered in the waveguide as respective light pulses travel along the waveguide;

comparing the signals to identify differences in the intensity of light backscattered in the waveguide as the respective light pulses travel along the waveguide, and filtering the light before it reaches the photodetector,
wherein the optical bandwidth of the filtering is less than the spectral width of the light source.

Preferably, the optical filter is positioned to filter the backscattered light. This is advantageous as it allows the spectral width of light traveling in the optical waveguide to be greater than that of the detected backscattered light. As spectral width is related to coherence, the filtering can ensure that the detected light is sufficiently coherent to that the temporal speckle pattern can be detected. At the same time, the light traveling in the waveguide can be relatively spectrally broad so that non-linear effects in the optical waveguide, such as Brillouin scattering, can be reduced.

Preferred embodiments of the invention are described below, by way of example only, with reference to the accompanying drawings.

DETAILED DESCRIPTION OF THE PREFERRED EMBODIMENTS

Figure 1:
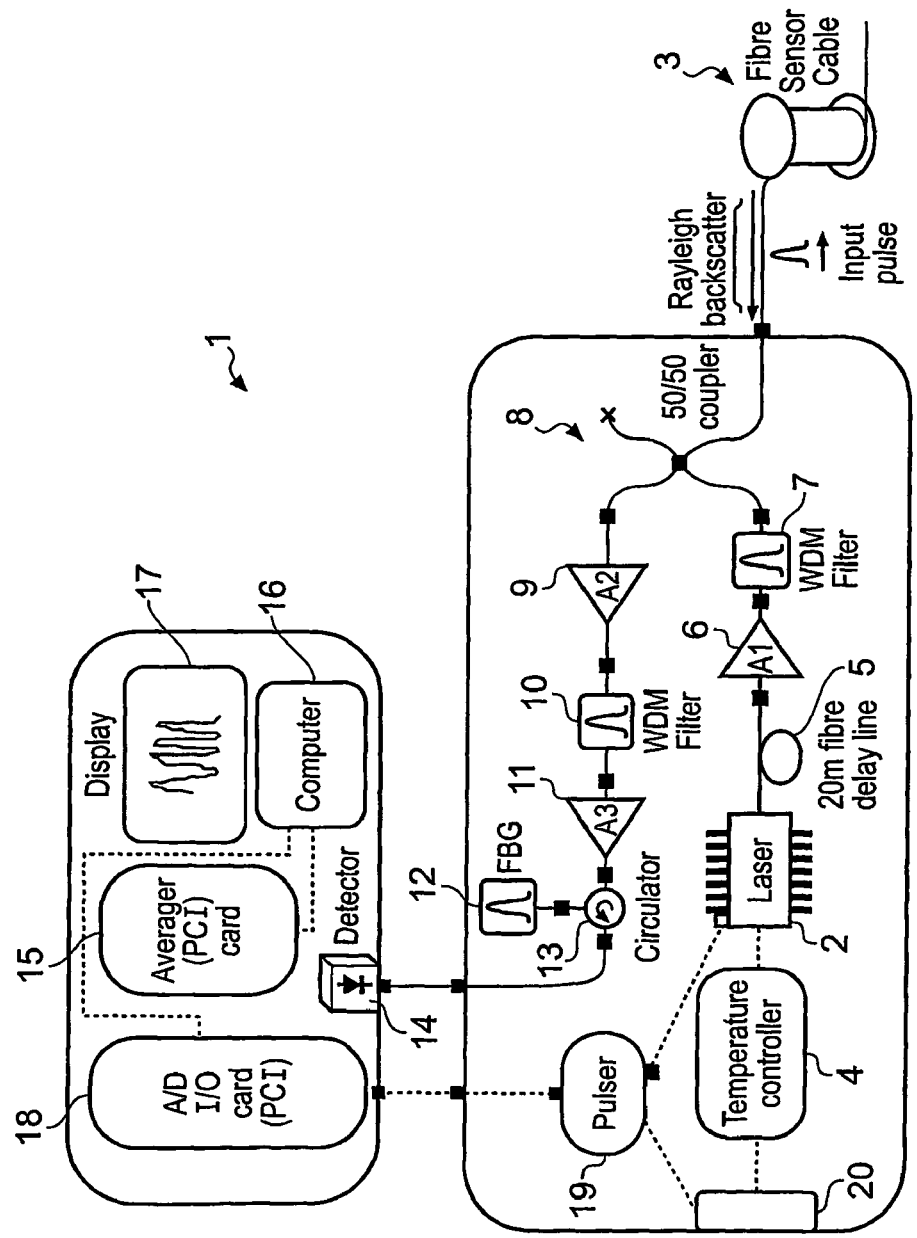
FIG. 1 is a schematic representation of a partially coherent Optical Time Domain Reflectometry (OTDR) apparatus according to a first preferred embodiment of the invention.

Referring to FIG. 1, a partially coherent Optical Time Domain Reflectometry (OTDR) apparatus 1 according to a first embodiment of the present invention has a light source comprising a directly modulated semiconductor Distributed FeedBack (DFB) laser diode 2 for transmitting light pulses along a monomode optical fibre 3. DFB laser diodes are common in optical wavelength division multiplexed (WDM) telecommunication networks and, in this embodiment, the DFB laser diode 2 is of the type typically used in 2.5 Gbps WDM telecommunications. A temperature stabilising unit comprising a Peltier element 4 is provided to control the temperature of the DFB laser diode 2. As the temperature of the DFB laser diode 2 changes, so does the wavelength of the light pulses it transmits. The Peltier element 4 enables precise wavelength control over around a 1 to 2 nm range, so that the wavelength of the light pulses can be adjusted. Typically, the wavelength of the light pulses is around that for which the monomode optical fibre 3 is designed, e.g. as defined by the standardised ITU (International Telecommunication Union) wavelength grid, or around 1550 nm in this embodiment of the invention.

Figure 2B:
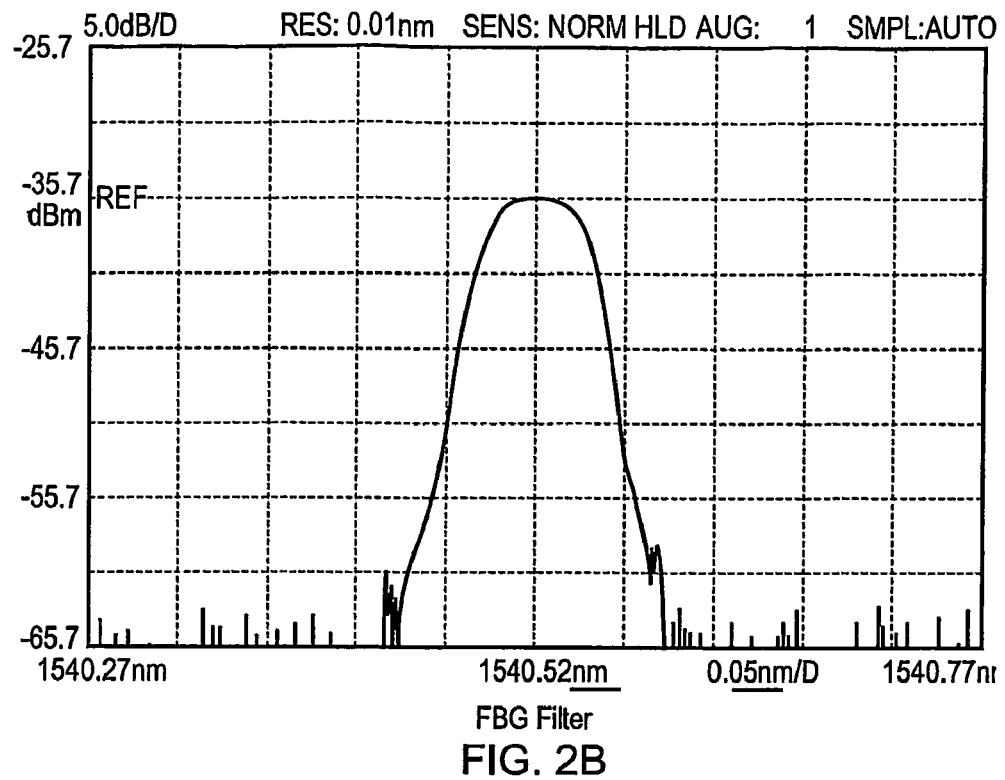
FIG. 2B is a graphical representation of the band of wavelengths of light passed by a Fibre Bragg Grating optical filter of the OTDR apparatus illustrated in FIG. 1.
Figure 2A:
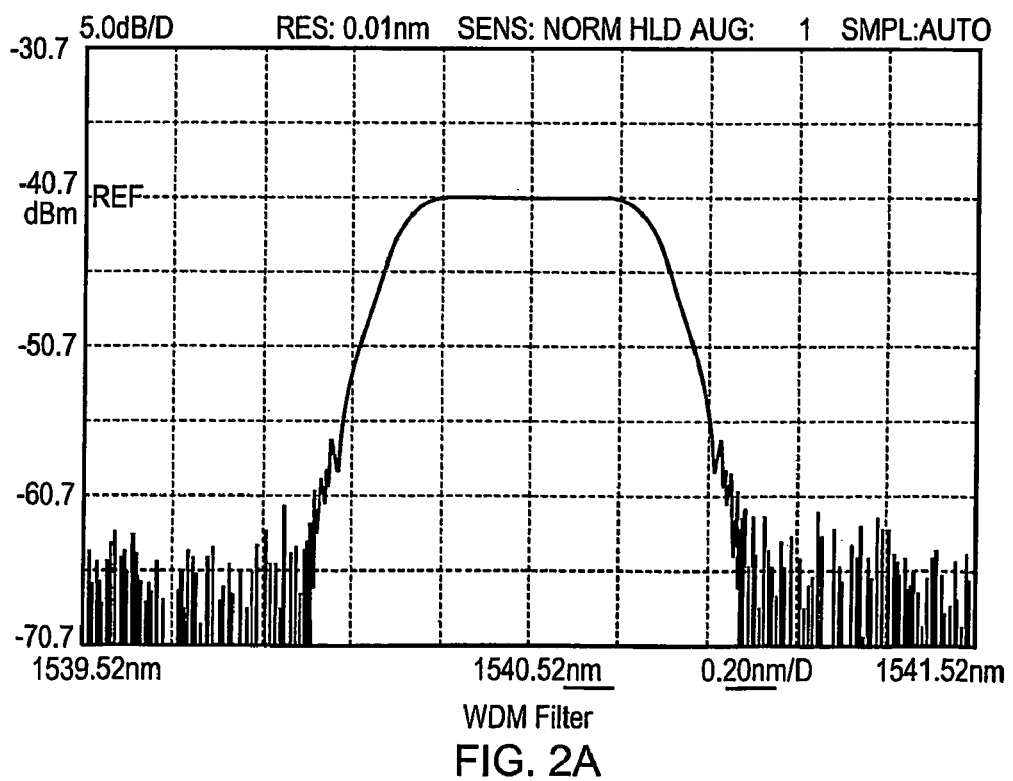
FIG. 2A is a graphical representation of the band of wavelengths of light passed by another optical filter of the OTDR apparatus illustrated in FIG. 1.

A delay line 5 comprising a 20 m long section of monomode optical fibre similar to the monomode optical fibre 3 mentioned above is spliced to the output of the DFB laser diode 2. The delay line 5 prevents feedback of light into the laser cavity of the DFB laser diode 2 arising from connector reflections or such like during the time it takes the DFB laser diode 2 to output each light pulse. The output end of the delay line 5 is connected to a first optical amplifier 6. The first optical amplifier 6, also known as a booster, is an Erbium-Doped Fibre Amplifier (EDFA) that amplifies the light pulses with a typical optical gain between around 20 and 25 dB. The output of the first optical amplifier 6 is connected to a first optical filter 7. In this embodiment, the first optical filter 7 is a WDM bandpass filter having a spectral width of around 75 GHz (0.6 nm), as shown in FIG. 2A. The first optical filter 7 reduces broad amplified spontaneous emission from the first optical amplifier 6. This generally comprises light at wavelengths above and below the main spectrum of the light pulses output by the DFB laser diode 2. The output of the first optical filter 7 is connected to an optical coupler 8 for directing the filtered, amplified light pulses output by the first optical filter 7 into the optical fibre 3. In this embodiment, the optical coupler 8 is a 50:50 3 dB fused fibre coupler, but in other embodiments a 3-port circulator can be used instead, with the benefit of reducing the loss from 3 dB to around 1 dB per port.

The optical coupler 8 is also arranged such that light Rayleigh backscattered from the light pulses as they travel along the optical fibre 3 is output from the end of the fibre 3 into which the light pulses are transmitted to an amplification stage. The amplification stage comprises a second optical amplifier 9, a second optical filter 10 and a third optical amplifier 11 connected in series. The second and third optical amplifiers 9, 11, also known as pre-amplers, are EDFAs similar to the first optical amplifier 6 mentioned above. They can each amplify the Rayleigh backscattered light received from the optical fibre 3 with optical gain between around 20 and 25 dB, but they have lower noise than the first optical amplifier 6. The second optical filter 10 is similar to the first optical filter 7. So, it is a WDM bandpass filter having a spectral width of around 75 GHz (0.6 nm).

The amplification stage is connected to output the amplified, filtered backscattered light to a Fibre Bragg Grating (FBG) filter 12 via a 3-port circulator 13. The FBG filter 12 has a spectral width of around 7.5 GHz (0.06 nm), as shown in FIG. 2B. The FBG filter 12 has a temperature sensitivity of around 0.0005 nm/° C. So, it is thermally packaged, e.g. surrounded by an insulating housing, to help ensure that the temperature of the FBG filter 12, and hence the band of wavelengths of light it passes, remains as constant as possible. The temperature of the DFB laser diode 2 can then be adjusted using the Peltier element 4 described above such that a selected wavelength range of the light pulses emitted by the DFB laser diode 2 matches the band of wavelengths of light passed by the FBG filter 12, as discussed in more detail below.

Light output by the FBG filter 12 is directed, via the 3-port circulator 13, to a photodetector 14. The photodetector 14 is, in this embodiment, an Indium Galium Arsenide (InGaAs) p-i-n photodetector with an electronic detection bandwidth of around 125 MHz and a transimpedance amplifier of around 1400 ohms. When it receives light from the FBG filter 12 it generates an analogue electronic signal representative of the intensity of the received light. The photodetector 14 is connected to output this analogue electronic signal to a digitising card 15, which has a similar analogue electronic bandwidth to the photodetector 14. The digitising card 15 converts the analogue signal to a digital signal. It can also average the analogue signal over a given number of successive light pulses, if required, under control of a computer 16, to which the digitising card 15 also outputs the digital signal.

The computer 16 has a processor (not shown) for determining, and a display 17 for displaying, a representation of differences between the digital signals received from the digitising card 15 representing the (averaged) intensity of light received by the photodetector 14 as a result of Rayleigh backscattering in the optical fibre 3 from successive light pulses. The display usually shows this difference information graphically as a difference magnitude versus distance along the optical fibre 3. The information can also be stored in a suitable memory device (not shown) of the computer 16.

The computer 16 also has an Input/Output card 18 for communicating with a controller 19 that controls a power supply 20 to the DFB laser 2 so that the DFB laser 2 can be directly modulated. The computer 16 can command the controller 19 to control the output of the DFB laser 2 as required. In a typical scenario, the controller 19 modulates the power supply 20 to the DFB laser 2 such that the DFB laser 2 outputs light pulses having duration between around 1 ns and around 100 ns. In this embodiment, the light pulses have duration around 10 ns, which corresponds with a spatial pulse length of around 1 m. The frequency with which the computer controls the DFB laser 2 to repeat the light pulses, e.g. the pulse repetition frequency or modulation frequency of the system, is determined by the time it takes the light pulse to travel to the far end of the optical fibre 3 and the light Rayleigh backscattered from the light pulse to return from the far end of the optical fibre 3, e.g. the light round trip time of the entire length of the fibre 3. In other words, light backscattered from each pulse should ideally be received by the photodetector 14 before the next pulse is transmitted along the fibre 3. In this embodiment, the optical fibre 3 is around 10 km long. A suitable pulse repetition frequency is therefore around 10 kHz. This frequency defines the maximum rate at which the computer 16 can determine and display the difference information, e.g. the maximum measurement frequency of the apparatus 1. Any averaging performed by the digitising card 15 reduces the measurement frequency, with the measurement frequency being inversely proportional to the number of light pulses over which the analogue signals are averaged by the digitising card 15. Overall, the measurement frequency of the apparatus 1 is sufficient to allow detection of acoustic waves. Hence, the apparatus can be used as a geophone, hydrophone, accelerometer, seismometer or such like.

The DFB laser diode 2 has a spectral width of around 1 MHz when generating a continuous output, which means that it can output light having temporal coherence of around 1 μs. However, when the DFB laser diode 2 is directly modulated, as it is here, the spectral width of the light pulses is considerably greater and the temporal coherence of the emitted light pulses is considerably less. There is a fundamental limitation that any light pulse of duration T cannot have a spectral width less than 1/T or temporal coherence greater than T. The 10 ns light pulses used here therefore have a minimum theoretical spectral width 0.1 GHz (1 pm) and a maximum theoretical temporal coherence of 10 ns. Furthermore, modulating the electric current supplied to the DFB laser diode 2 results in a modulation of the density of electrons in the laser cavity of the diode 2. This, in turn, causes fluctuations in the refractive index of the material from which the laser cavity of the diode 2 is formed, leading to chirp in the frequency of the output light pulse. So, referring to FIG. 3, it can be seen that the wavelength of a 1 μs light pulse output by the DFB laser diode 2 varies considerably over its duration. At the beginning of the light pulse there is a so-called blue shift from a longer wavelength to a shorter wavelength over around 0.1 ns, as shown by the downward slope 21 in FIG. 3. Toward the end of the light pulse there is a so-called red shift from a shorter wavelength to a longer wavelength over around 10 to 100 ns, as shown by the upward slope 22 in FIG. 3. The overall range of the frequency chirp is around 20-50 GHz. This frequency chirp defines the spectral width of the optical pulses and corresponds to a range of wavelengths of light of around 0.16 to 0.4 nm and a temporal coherence between around 20 to 50 ps. More generally, the temporal coherence of light pulses with duration in the range of 1-100 ns produced by direct modulation of the DFB laser diode 2 are two to three orders of magnitude shorter than the pulse duration.

Figure 4:
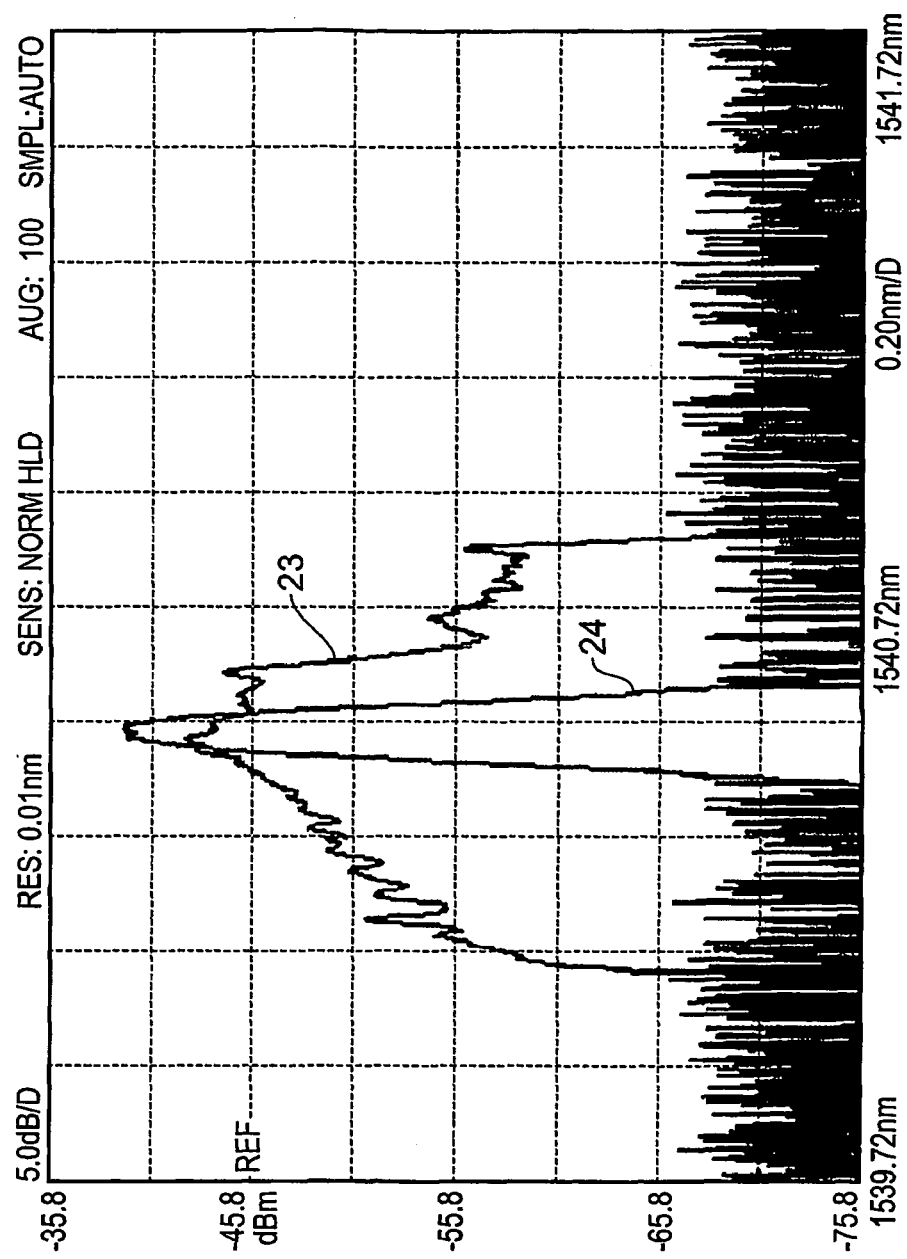
FIG. 4 is a graphical representation of the band of wavelengths of light passed by a Fibre Bragg Grating optical filter compared to the wavelengths of a light pulse after it has travelled 1 km along the optical fibre of the OTDR apparatus illustrated in FIG. 1.

However, the optical filters 7, 10 and the FBG filter 12 reduce the spectral width of light received at the photodetector 14. As the FBG filter 12 has the narrowest spectral width, the reduction in spectral width is governed primarily by this filter 12. Indeed, the other optical filters 7, 10 are only intended to reduce spontaneous emission from the first and second amplifiers 6, 9, as mentioned above. Looking at FIG. 4, it can be readily appreciated that the band of wavelengths of light passed by the FBG filter 12, shown by line 23, is far narrower that the full range of wavelengths of light present in the light pulse as it travels along the optical fibre 3, shown by line 24. Indeed, in this embodiment, it can be seen that the spectral width of the FBG filter 12 is around one fifth of the spectral width of the light pulse after it has travelled around 1 km along the optical fibre 3 (which spectral width is much the same as the light pulse as emitted by the DFB laser diode 2 and the light Rayleigh backscattered in the optical fibre 3).

Figure 3:
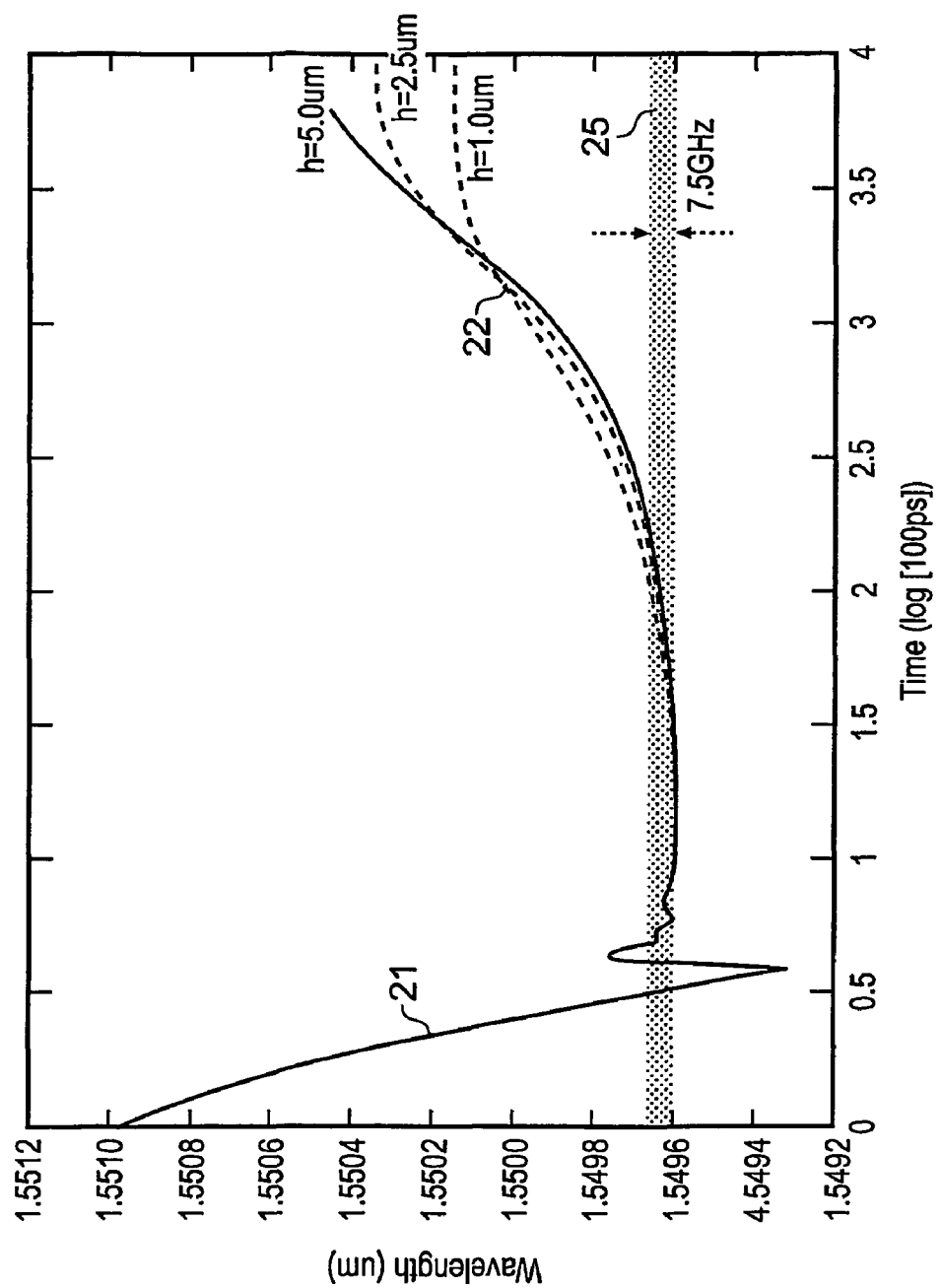
FIG. 3 is a graphical representation of the wavelength of a light pulse output by a DFB laser diode of the partially coherent OTDR apparatus against time.

In more detail, FIG. 3 shows an optimum relation between the band of wavelengths of light passed by the FBG filter 12, shown as a shaded band 25 and the range of wavelengths of the light pulse emitted by the DFB laser diode 2. The band of wavelengths of light passed by the FBG filter 12 is ideally related to the range of wavelengths of the light pulse emitted by the DFB laser diode 2 such that clipping of the pulse duration is minimised. In other words, they are arranged to overlap at a time during the pulse duration at which the wavelength is relatively constant. This is towards the middle of the pulse duration, when the pulse also tends to have maximum power.

As a consequence of reducing the spectral width of the light received at the photodetector 14, the FBG filter 12 also increases the temporal coherence of the light. In this embodiment, the FBG filter 12 has a spectral width of 7.5 GHz (0.06 nm), so the temporal coherence of the light received at the photodetector 14 is around 100 ps, which is significantly longer than the temporal coherence of the light pulse as it travels along the optical fibre 3. Importantly, the coherence of the light arriving at the photodetector 14, rather than the light travelling along the optical fibre 3, determines the amount of detected light that is coherently related and can contribute to the temporal speckle pattern compared to the amount of detected light that is not coherently related and therefore contributes to a reduction in visibility of the temporal speckle pattern. The ratio of these amounts can be defined as a visibility parameter $V_I$. This visibility parameter $V_I$ is analysed statistically in the paper "Characteristics and Reduction of Coherent Fading Noise in Rayleigh Backscattering Measurement for Optical Fibres and Components", Shimizu et al, Journal of Lightwave Technology, Vol. 10, No. 7, p. 982 (1992). It can be readily appreciated that for completely coherent light the visibility parameter $V_I$ is 1. As the coherence of the light decreases, so does the visibility parameter $V_I$. For the light received at the photodetector 14 in this embodiment of the invention the visibility parameter $V_I$ is around 0.133. More generally, in other embodiments of the invention, the visibility parameter $V_I$ is between around 0.04 and 0.26.

The probability density function P(I) of the intensity of light received at the photodector 14 (due to Rayleigh backscattering) can be expressed in terms of the visibility parameter $V_I$ by the following equation $$P(I) = \left[\frac{1}{V_I^2 \langle I \rangle}\right]^{\frac{1}{V_I^2}} \frac{1}{\left(\frac{1}{V_I^2} - 1\right)!} I^{\left(\frac{1}{V_I^2} - 1\right)} \exp\left[-\frac{I}{V_I^2 \langle I \rangle}\right].$$

Figure 5:
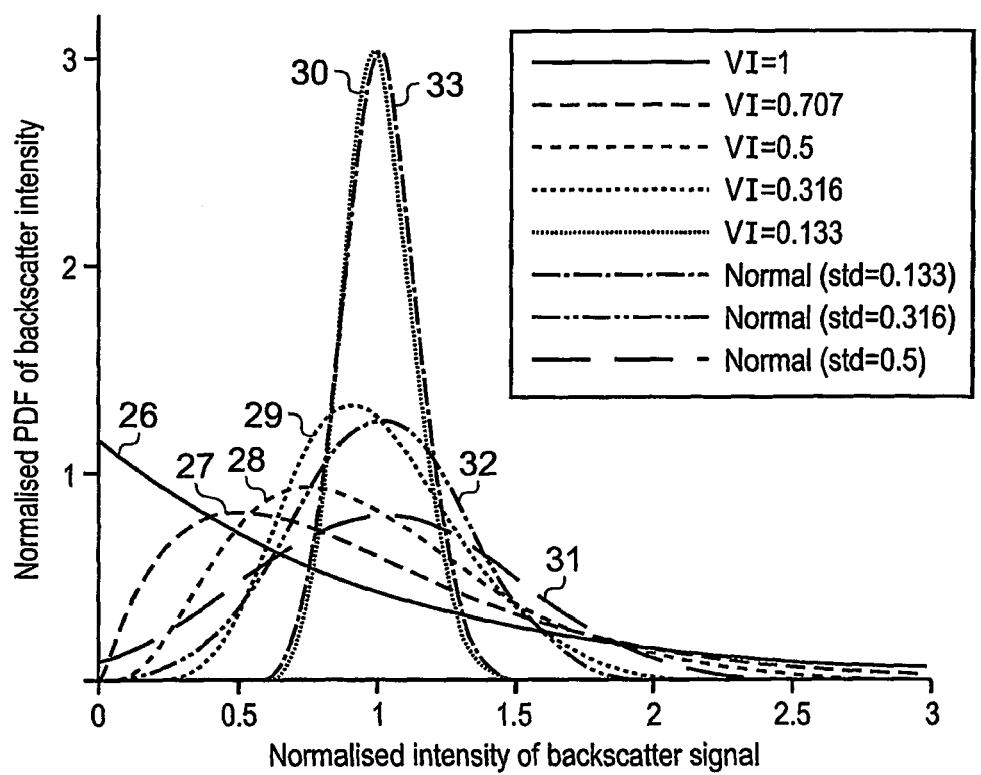
FIG. 5 is a graphical representation of the intensity of light received at a photodetector of the OTDR apparatus shown in FIG. 1 for light pulses having different degrees of coherence.

This is illustrated graphically in FIG. 5 for various values of the visibility parameter $V_I$. It can be seen that when the visibility parameter $V_I$ is 1, the probability density function P(I) is maximum at a normalised intensity of zero and decreases as the normalised intensity increases from zero to higher values, as shown by slope 26. When the visibility parameter $V_I$ had successively lower values of 0.707, 0.5, 0.316 and 0.133, as shown by slopes 27, 28, 29 and 30 respectively, the probability density function P(I) increasingly closely takes the form of a normal distribution, the ideal curves of which are illustrated for amplitudes equivalent to visibility parameter $V_I$ values of 0.5, 0.316 and 0.133 by dashed curves 31, 32 and 33 respectively. The significance of this is that for the values of the visibility parameter $V_I$ present in the described embodiments of the present invention, the range of variation in intensity of light received at the photodetector 14 in constrained to a normal distribution and is less than that which would be present if the light were fully coherent.

In order to successfully detect the temporal speckle pattern and hence differences in the temporal speckle pattern generated by successive light pulses, it is important for the range of variation of intensity of light received by the photodetector 14 due to the temporal speckle pattern to be greater than noise in the signal output by the photodetector 14. The requirement is equivalent to the condition that the signal to noise ratio (SNR) of the apparatus 1 is greater than the reciprocal of the visibility parameter $V_I$, e.g.

$$SNR > \frac{1}{V_I}$$

Noise arises from both optical noise contributed by the optical amplifiers 6, 9, 11 and so on and electrical noise introduced by the photodetector 14. More specifically, the SNR after detection of the backscattered light by the photodetector 14 can be expressed by the following equation $$SNR = \frac{1}{\Delta f} \frac{\langle R(GP_s) \rangle^2}{[R^2(NEP)^2 + 2(q\eta G)^2 F_n P_s / hv + (q\eta GF_n)^2 \Delta v_{opt}]}$$

where $$G = G_1 G_2 \text{ and } F_n = F_{n1} + \frac{F_{n2}}{G_1}.$$

in which $\Delta f$ is the electronic detection bandwidth of the photodetector 14 (125 MHz in this embodiment), R is a responsivity parameter for the photodetector 14, G is the composite gain of the two optical amplifiers 9, 11 of the amplification stage (having gain $G_1$ and $G_2$ respectively), $P_s$ is the overall signal power reaching the photodetector 14, NEP is the noise equivalent power of the photodetector 14, q is the electronic charge, η is a quantum efficiency parameter for the photodetector 14, $F_n$ is the effective noise figure of the two optical amplifiers 9, 11 of the amplification stage (having effective noise figures $F_{n1}$ and $F_{n2}$ respectively), h is the quantum constant (or Planck's constant), v is the frequency of the light received at the photodetector 14, and $\Delta v_{opt}$ is the spectral width of the light received at the photodetector 14.

Figure 6:
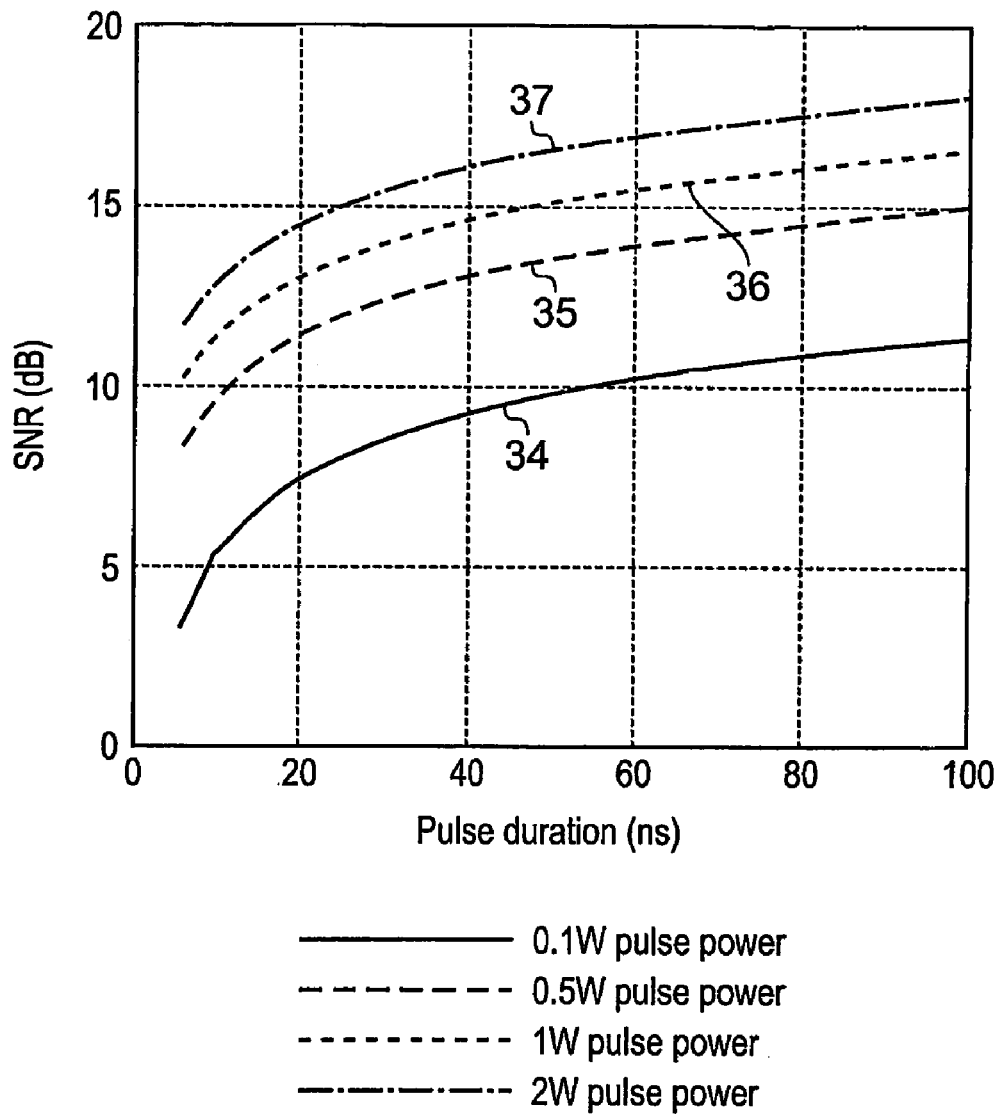
FIG. 6 is a graphical representation of the Signal to Noise Ratio (SNR) of a signal output by the photodetector of the OTDR apparatus shown in FIG. 1 for light pulses having different power.

This SNR is illustrated graphically in FIG. 6 versus pulse duration for several different pulse launch powers (i.e. light power after amplification by the first optical amplifier 6 or booster). More specifically SNR for pulse launch powers of 0.1 W, 0.5 W, 1 W and 2 W are shown by curves 34, 35, 36 and 37 respectively. It can be seen that SNR increases with pulse launch power. The illustrated curves include the 3 dB loss of the optical coupler 8 and assume that each of the amplifiers 9, 10 of the amplification stage has a noise figure of 5.5 dB. The gain of the amplifiers 9, 10 is adjusted for different pulse launch powers in order to maintain the output voltage level from the photodetector 14 close to the maximum input voltage range (0.5V) of the digitising card 15. The composite gain required did not exceed a maximum of 38 dB for any of the calculated curves. A single optical pulse is considered, with no signal averaging.

It be seen from FIG. 6 that for a launch power of 1 W, an SNR of around 15 dB can be achieved. The logarithm of the reciprocal of the visibility parameter $V_I$ is equivalent to a signal level around 9 dB, which means that the SNR of the digital signal output by the digitising card 15 is around 6 dB higher and the temporal speckle pattern should be easily distinguishable from the predicted noise.

The freedom to use optical pulses having high launch power to increase SNR whilst maintaining a relatively high Visibility parameter $V_I$ is largely provided by appropriate positioning of the FBG filter 12. More specifically, the optical pulse traveling in the optical fibre 3 is relatively spectrally broad, which means that the effects of Brillouin scattering are much less than for an spectrally narrower optical pulse of the same power. At the same time, as the temporal coherence of the backscattered light arriving at the photodetector 14 is increased by the FBG filter 12, a relatively high Visibility parameter $V_I$ can be maintained.

Figure 7:
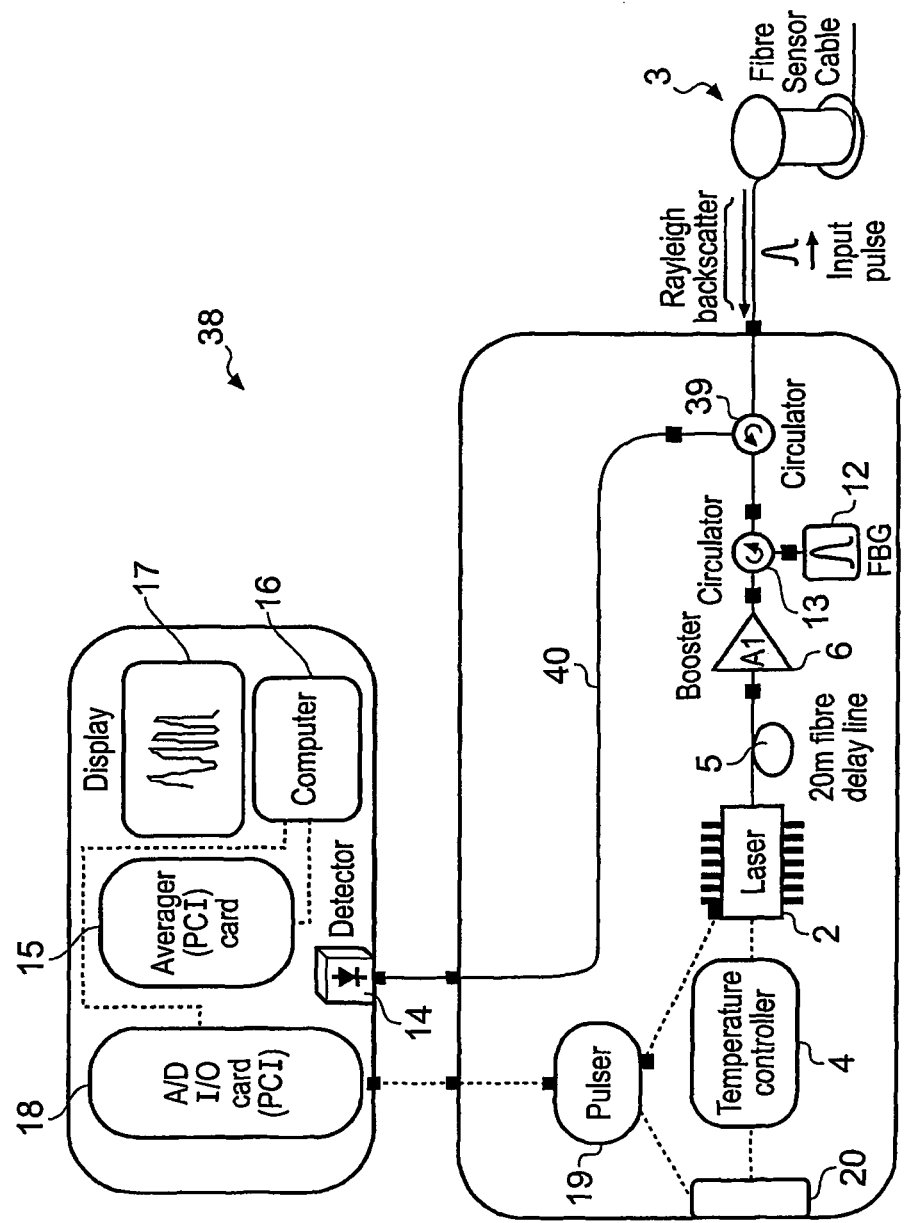
FIG. 7 is a schematic representation of a partially coherent Optical Time Domain Reflectometry (OTDR) apparatus according to a second preferred embodiment of the invention.

Nonetheless, it is still possible to design an effective apparatus in which the spectral width and temporal coherence of the optical pulse traveling in the optical fibre 3 and the backscattered light arriving at the photodetector 14 are substantially the same. Referring to FIG. 7, a partially coherent OTDR apparatus 38 according to a second embodiment of the present invention comprises many similar components to the partially coherent OTDR apparatus 1 according to the first embodiment of the present invention, and similar components are labeled with the same reference numerals. However, in this second embodiment, the circulator 13 and FBG filter 12 are arranged at the position of the first optical filter 7 in the first embodiment. In other words, the FBG filter 12 is positioned between the output of DFB laser diode 2 and the optical fibre 3. This means that the FBG filter 12 influences the spectral width of the light pulses traveling in the optical fibre 3, which is therefore around 7.5 GHz. This is still well above the Brillouin Gain bandwidth for the optical fibre 3, which is around 17 MHz. Nonetheless, as there are no amplifiers to amplify the backscattered light before it arrives at the photodetector 14, the light pulses should ideally have longer duration in order that sufficient light is backscattered from each light pulse to generate a useful signal at the photodetector 14. Indeed, the optical pulses typically have a spatial duration of around 50 to 100 m in this second embodiment when no averaging is used, which limits the spatial resolution of the apparatus 38.

In one version of the second embodiment, the photodetector 14 is an InGaAs p-i-n photodetector with a three stage transimpedance amplifier, such as model 2053 from New Focus, having an electronic bandwidth of 700 kHz, a voltage responsivity $1.89 \times 10^6$ V/W and an NEP of 0.34 pW/rtHz. For light pulses of duration 500 ns (50 m) launched into the optical fibre 3 with power 500 mW, the predicted SNR is about 35 dB. The logarithm of the reciprocal of visibility parameter $V_I$ is equivalent to a signal level around 18 dB, which means that the SNR is around 17 dB higher and the temporal speckle pattern should be easily distinguishable from the predicted noise.

In another version of the second embodiment, the photodetector 14 is an InGaAs avalanche photodiode with an integrated hybrid preamplifier, such as model C30662E from Perkin Elmer, having an electronic bandwidth of 50 MHz, a voltage responsivity $3.4 \times 10^5$ V/W and an NEP of 0.13 pW/rtHz. IF the electronic bandwidth is limited to 700 kHz by a low pass filter, the predicted SNR is around 40 dB. Again, as the logarithm of the reciprocal of the visibility parameter $V_I$ is equivalent to a signal level around 18 dB, the SNR is around 22 dB higher and the temporal speckle pattern should be easily distinguishable from the predicted noise.

The described embodiments of the invention are only examples of how the invention may be implemented. Modifications, variations and changes to the described embodiments will occur to those having appropriate skills and knowledge. These modifications, variations and changes may be made without departure from the spirit and scope of the invention defined in the claims and its equivalents.

The invention claimed is:

1. An apparatus for detecting a disturbance in the phase of light propagating in an optical waveguide, the apparatus comprising:
   a light source for sending partially coherent successive light pulses along the waveguide;
   a photodetector for generating signals representing the time distributed speckle pattern intensity of light backscattered in the waveguide as respective partially coherent light pulses travel along the waveguide; and
   a processor for comparing the signals to identify differences in the intensity of light backscattered in the waveguide as the partially coherent respective light pulses travel along the waveguide,
   wherein the photodetector detects the backscattered light within a spectral width of the order of around 0.1 GHz to 100 GHz.

2. The apparatus of claim 1, wherein the partially coherent light pulses sent along the waveguide have a spectral width of the order of around 1 GHz to 10 GHz.

3. The apparatus of claim 1, wherein the partially coherent light pulses sent along the waveguide have a spectral width of around 7.5 GHz.

4. The apparatus of claim 1, wherein the spatial length of the partially coherent light pulses is of the order of around 1 m to 100 m.

5. The apparatus of claim 1, wherein the spatial length of the partially coherent light pulses is of the order of around 1 m to 10 m.

6. The apparatus of claim 1, wherein the spatial length of the partially coherent light pulses is around 1 m.

7. The apparatus of claim 1, wherein the power of the partially coherent light pulses is of the order of around 0.1 W to 10 W.

8. The apparatus of claim 1, wherein the power of the partially coherent light pulses is around 2 W.

9. The apparatus of claim 1, wherein the photodetector has an electronic bandwidth of around 125 MHz.

10. The apparatus of claim 1, further comprising an optical filter for filtering the light before it reaches the photodetector, wherein the optical bandwidth of the optical filter is less than the spectral width of the light source.

11. A method for detecting a disturbance in the phase of light propagating in an optical waveguide, the method comprising:
    causing a light source to send successive partially coherent light pulses along the waveguide;
    generating signals representing the time distributed speckle pattern intensity of light backscattered in the waveguide and received at a photodetector as respective partially coherent light pulses travel along the waveguide; and
    comparing the signals to identify differences in the intensity of light backscattered in the waveguide as the respective partially coherent light pulses travel along the waveguide,
    wherein the generated signals are generated in response to backscattered light received at the photodetector within a spectral width of the order of around 0.1 GHz to 100 GHz.

12. The method of claim 11, wherein the partially coherent light pulses sent along the waveguide have a spectral width of the order of around 1 GHz to 10 GHz.

13. The method of claim 11, wherein the partially coherent light pulses sent along the waveguide have a spectral width of around 7.5 GHz.

14. The method of claim 11, wherein the spatial length of the partially coherent light pulses is of the order of around 1 m to 100 m.

15. The method of claim 11, wherein the spatial length of the partially coherent light pulses is of the order of around 1 m to 10 m.

16. The method of claim 11, wherein the spatial length of the partially coherent light pulses is around 1 m.

17. The method of claim 11, wherein the power of the partially coherent light pulses is of the order of around 0.1 W to 10 W.

18. The method of claim 11, wherein the power of the partially coherent light pulses is around 2 W.

19. The method of claim 11, wherein the signals are generated by a photodetector having an electronic bandwidth of around 125 MHz.

20. The method of claim 11, comprising filtering the light before generating the signals, wherein the optical bandwidth of the filtering is less than the spectral width of the light source.

21. The apparatus of claim 10, wherein the optical bandwidth of the optical filter is of the order of around 0.1 GHz to 100 GHz.

22. The apparatus of claim 10, wherein the optical bandwidth of the optical filter is of the order of around 1 GHz to 10 GHz.

23. The apparatus of claim 10, wherein the optical bandwidth of the optical filter is of the order of around 7.5 GHz.

24. The apparatus of claim 10, wherein the optical filter is positioned to filter the backscattered light.

25. The method of claim 20, wherein the optical bandwidth of the filtering is of the order of around 0.1 GHz to 100 GHz.

26. The method of claim 20, wherein the optical bandwidth of the filtering is of the order of around 1 GHz to 10 GHz.

27. The method of claim 20, wherein the optical bandwidth of the filtering is of the order of around 7.5 GHz.

28. The method of claim 20, wherein the filtering is performed on the backscattered light.

29. The apparatus of claim 1, wherein the partially coherent light pulses sent along the waveguide have a spectral width of the order of around 0.1 GHz to 100 GHz.

30. The apparatus of claim 1, further comprising an optical filter positioned to filter the light before it reaches the photodetector, the optical filter transmitting light having a spectral width of the order of around 0.1 GHz to 100 GHz.

31. The apparatus of claim 11, wherein the partially coherent light pulses sent along the waveguide have a spectral width of the order of around 0.1 GHz to 100 GHz.

32. The method of claim 11, further comprising the step of filtering the light before it reaches the photodetector, the filtering having an optical bandwidth of around 0.1 GHz to 100 GHz.

* * * * *